United States Patent [19]

Ito et al.

[11] Patent Number: 4,514,810
[45] Date of Patent: Apr. 30, 1985

[54] NAVIGATOR FOR VEHICLES

[75] Inventors: Yoji Ito, Kariya; Yozo Inoue, Chiryu; Kiyoshi Hara, Oobu; Kazuo Muramoto, Ichinomiya; Kunio Miura, Okazaki, all of Japan

[73] Assignee: Nippondenso Co., Ltd., Kariya, Japan

[21] Appl. No.: 418,530

[22] Filed: Sep. 15, 1982

[30] Foreign Application Priority Data

Sep. 17, 1981 [JP] Japan .................. 56-147096
Sep. 22, 1981 [JP] Japan .................. 56-150189

[51] Int. Cl.³ .................. G06F 15/50; G09B 29/10
[52] U.S. Cl. .................. 364/424; 364/449; 364/521; 343/451; 340/990; 340/995; 73/178 R
[58] Field of Search .............. 364/424, 443, 444, 449, 364/521; 353/11, 12; 343/450–453; 340/988–990, 992, 995, 996; 73/178 R; 358/104

[56] References Cited

U.S. PATENT DOCUMENTS

| 4,071,895 | 1/1978 | Wood et al. | 343/452 |
| 4,086,632 | 4/1978 | Lions | 364/521 |
| 4,139,889 | 2/1979 | Ingels | 364/424 |
| 4,360,876 | 11/1982 | Girault et al. | 343/451 |
| 4,367,453 | 1/1983 | Kuno et al. | 340/988 |
| 4,400,780 | 8/1983 | Nagao et al. | 343/452 |

FOREIGN PATENT DOCUMENTS 55-159299 12/1980 Japan .

Primary Examiner—Gary Chin
Attorney, Agent, or Firm—Cushman, Darby & Cushman

[57] ABSTRACT

A vehicle navigator is disclosed, in which in response to a storage command signal generated by the turning on of a storage switch, the present position data of a vehicle corresponding to the present cursor position is stored in a memory. In response to a set command signal subsequently generated by the turning on of a set switch, the running track data between the latest position stored and the present cursor position is stored in the memory, so that the running track is additionally displayed on a road map display device.

4 Claims, 13 Drawing Figures

NAVIGATOR FOR VEHICLES

FIELD OF THE INVENTION

The present invention relates to a navigator for vehicles in which the road map of a running region and the running position of a vehicle on the map are displayed.

BACKGROUND OF THE INVENTION

A conventional apparatus of this type, as disclosed by Japanese Laid-Open Patent Publication No. 159299/80, entitled "A Travelling Position Display Apparatus for Vehicles" comprises a transparent film printed with a road map provided on the front panel of a fluorescent display tube of dot matrix type, means for determining a planar coordinate by accumulatively computing the running distance in every direction from a starting point on the basis of detection signals produced from a running distance sensor and a direction sensor, and means for indicating the present running position of the vehicle on the road map by the display operation of the fluorescent display tube, thereby informing the driver of the present running position of the vehicle in an easier manner.

The disadvantage of this conventional apparatus using a transparent film printed with a road map is that in the case where a road not included in the road map is covered, which, for example, is very useful road such as a short cut, the driver who desires the vehicle to run along the same route on a later day is unable to identify the road which is not indicated on the road map.

The present invention has been made in view of the above-mentioned disadvantage of the conventional apparatuses and an object thereof is to provide a vehicle navigator comprising display means for displaying the running position of the vehicle additionally on a road map, command means for generating, by external operation, a timing command for storing the running track covered by the vehicle and not included in the road map of the display means, and control means for storing the running track in response to the timing command from the command means and additionally displaying the stored running track at the next time of display of the road map of the running region, thereby storing the running track covered along the roads not indicated on the road map and additionally displaying the particular running track on the road map.

According to the present invention, there is provided a vehicle navigator in which the running track of a road not included in a road map is stored and is additionally displayed on the road map on the next occasion, so that at the time of next coverage of the same region, the road along the running track is easily pin-pointed.

Other objects and features of this invention will be apparent from the following description with reference to the accompanying drawings, in which:

DETAILED DESCRIPTION OF THE INVENTION

Figure 1:
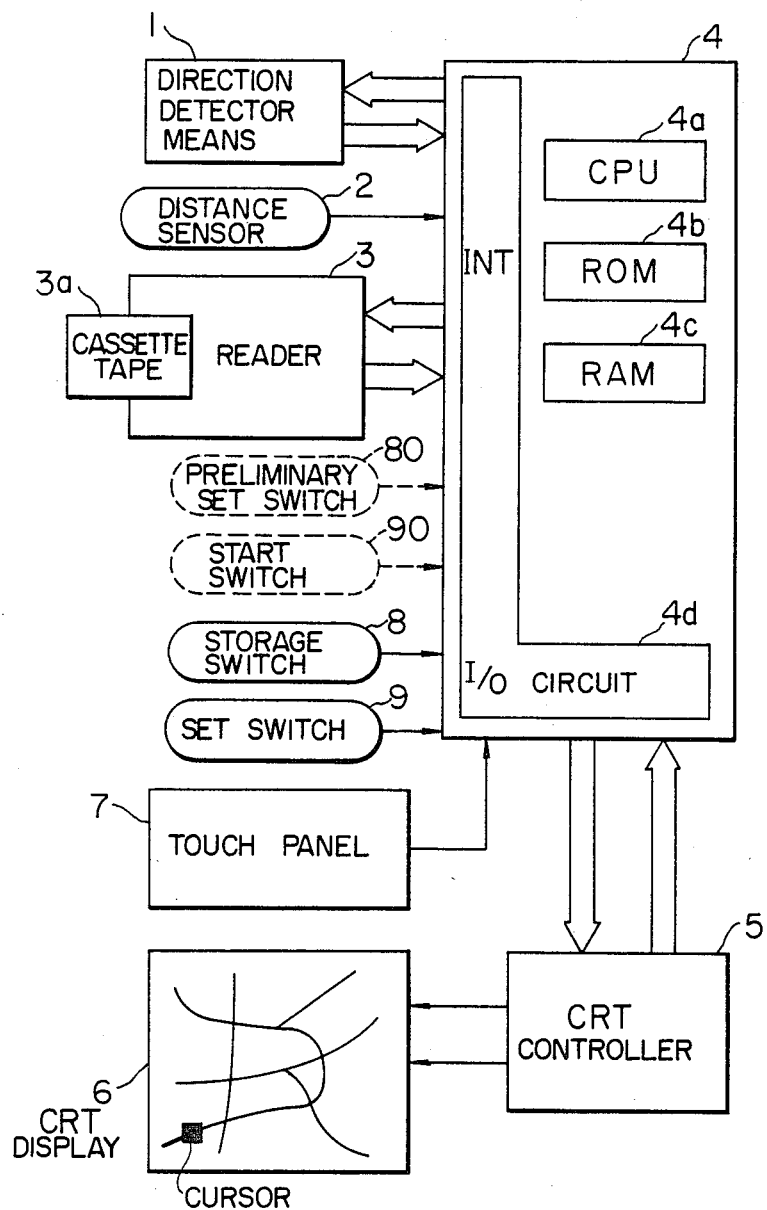
FIG. 1 is a diagram showing a general configuration according to a first embodiment of the present invention.

A general configuration of an embodiment of the present invention is shown in FIG. 1. In FIG. 1, reference numeral 1 designates direction detector means including a direction sensor for detecting the X and Y components of earth magnetism corresponding to the running direction of a vehicle and an A/D converter for converting the signal produced from the direction sensor into a digital signal and generating digital signals of X and Y components corresponding to the running direction of the vehicle. Numeral 2 designates a distance sensor for generating a distance pulse at intervals of the unit running distance (such as about 39.2 cm) of the vehicle. Numeral 3 designates a reader for searching for and reading map data for a specific region from among a plurality of regional map data (including the absolute coordinate data at the upper right corners of the maps) by setting a cassette tape 3a.

Numeral 4 designates a microcomputer for executing the digital operation of software in accordance with a predetermined control program. The microcomputer 4 includes a CPU 4a, a ROM 4b, a RAM 4c and an I/O circuit 4d, making up control means. In response to a stabilized voltage supplied from a stabilization power circuit (not shown) for generating a stabilized voltage of 5 V in response to the power supplied from a vehicle-mounted battery, the microcomputer 4 is activated. On the other hand, in response to digital signals of X and Y components produced from the direction detector 1, a distance pulse produced from the distance sensor 2, and a read signal produced from the reader 3, the microcomputer 4 executes the processing operation and generates a display signal for displaying the map of a specific region and the data on the running route. The RAM 4c is always backed up in power supply by the vehicle-mounted battery for storing the various data required for the processing operation of the CPU 4a and the data on the running track of a specific section of a specific region and the data on the latest running track (such as the one for several km).

Numeral 5 designates a cathode ray tube controller for storing the map data, the running route data and character data of specific regions individually in response to a display signal produced from the microcomputer 4, and generating a video signal and a sync. signal for displaying on a CRT the map data, the running route data or character data stored. Numeral 6 designates a CRT display unit making up display means for displaying on the CRT the map of a specific region, a running route or a character in response to the video signal and the sync. signal from the CRT controller 5. Numeral 7 designates a touch panel section providing a panel switch mounted on the display surface of the CRT display unit 6 for producing a corresponding serial signal when a specific one of the 12 touch areas provided on the touch panel is touched. Numeral 8 designates a memory storage switch, of the type which automatically returns to its original position, for producing a storage command for the running track, and numeral 9 designates a set switch, of the automatically returning type, for producing a set command for the running track storage. The storage switch 8 and the set switch 9 make up command means.

Figure 2:
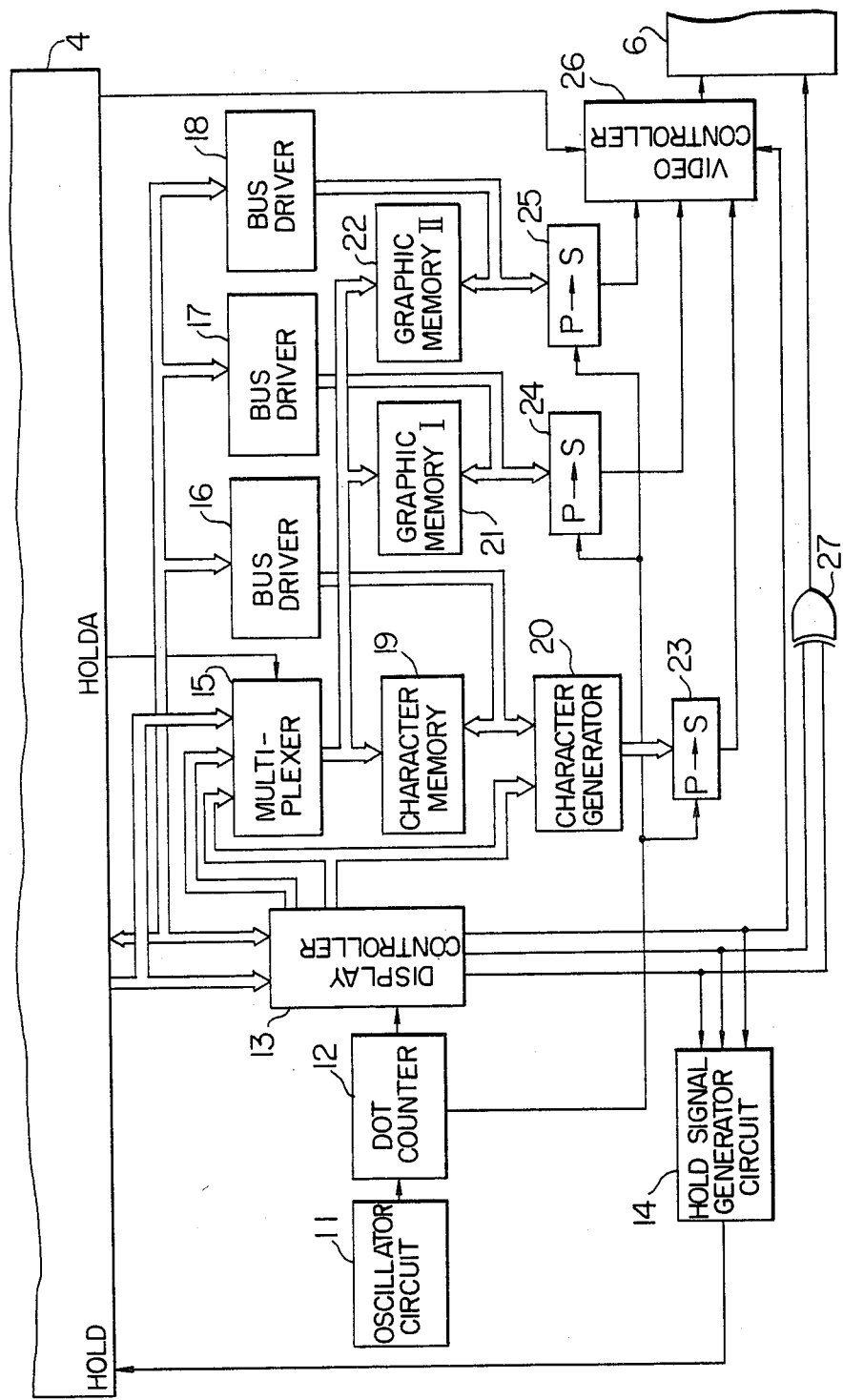
FIG. 2 is a detailed electrical circuit diagram of a CRT controller shown in FIG. 1.

Now, explanation will be made of the detailed electrical connections of the CRT controller shown in FIG. 2. Numeral 11 designates an oscillator circuit for generating an oscillation signal of 12.096 MHz, numeral 12 designates a dot counter for frequency-dividing the oscillation signal from the oscillator circuit 11 and generating a character timing clock of 756 KHz and a dot timing clock of 6.048 MHz, numeral 13 designates a display controller for generating horizontal and vertical sync. signals, a display timing signal, a refresh memory address signal and a raster address signal in response to a command produced from the microcomputer 4 and a character timing clock from the dot counter 12, and numeral 14 designates a hold signal generator circuit for generating a hold signal at the hold terminal of the microcomputer 4 for holding the microcomputer 4 during the display period on the basis of the horizontal and vertical sync. signals produced from the display controller 13. Numeral 15 designates a multiplexer for switching the address signal from the microcomputer 4, the raster address signal and the refresh memory address signal from the display controller 13 by the hold acknowledge signal (HOLDA) from the microcomputer 4. Numerals 16, 17 and 18 designate bus drivers having a tristate for switching the direction of data between the microcomputer 4 and the display memory. Numeral 19 designates a character memory for storing an ASCII code or other data from the microcomputer 4 and producing the content of the refresh memory address signal from the display controller as an address. Numeral 20 designates a character generator for producing a display pattern in response to the display address produced from the character memory 19 and the raster address signal produced from the display controller 13. Numeral 21 designates a first graphic memory for storing the map data produced from the microcomputer 4, numeral 22 designates a second graphic memory for storing the running route data (including the running track data and the present position data) produced from the microcomputer 4. Numerals 23, 24 and 25 designate parallel-serial (P→S) converters for converting the parallel signal produced by the character generator 20 and the first and second graphic memories 21 and 22 into serial data by the dot timing clock produced from the dot counter 12. Numeral 26 designates a video controller which, in order to select the graphic or character image by the image switch signal from the microcomputer 4, switches the receipt of the signals from the parallel-serial converter 23 and the parallel-serial converters 24, 25 thereby to produce a video signal in response to the display timing signal produced from the display controller 13. Numeral 27 designates an exclusive OR circuit for generating a sync. signal by the horizontal and vertical sync. signals produced from the display controller 13. The character memories 21, 22 are always backed up in power supply by the vehicle-mounted battery.

Specifically, the CRT controller 5 is such that in accordance with the data supplied from the microcomputer 4, the character data are stored in the character memory 19, the map data are stored in the first graphic memory 21, and the display data of the running track and the present position are always stored in the second graphic memory 22; the graphic image (for displaying the running track and the present position on the map) and the character image (for displaying a designated character specifying a region) are selected by an image switch signal produced from the microcomputer 4, thereby applying a video signal and a sync. signal to the CRT display unit for displaying an image corresponding to the selection.

Figure 3:
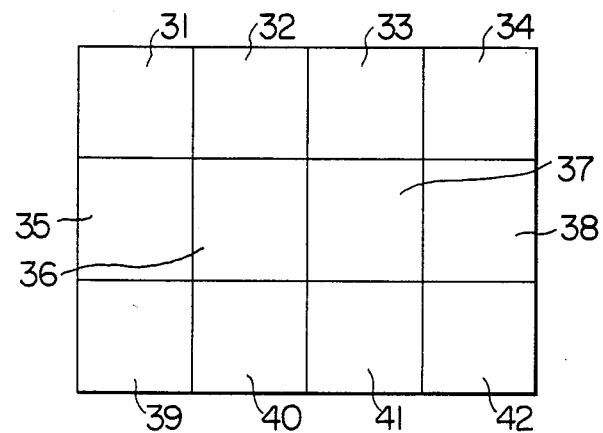
FIG. 3 is a diagram for explaining the touch areas of a touch panel section.

The touch panel 7 has 12 touch areas from 31 to 42 as shown in FIG. 3, and comprises a pair of glass sheets and transparent conductive films formed in a matrix on the glass sheets. Upon depressing a specific touch area, the contact of the displaced glass with the transparent conductive film of the matrix is used to detect the particular touch area, so that a touch signal generator circuit not shown generates a serial signal (including a start signal and a touch data signal) corresponding to the touched area. The touch signal generator circuit generates a serial signal on the touch data at intervals of 40 msec.

Figure 4:
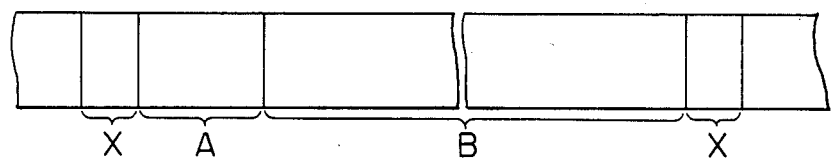
FIG. 4 is a diagram for explaining data sections of a cassette tape.

FIG. 4 shows data sections of a region recorded in the cassette tape 3a, in which character A shows a header section for storing the absolute coordinate (corresponding to the north pole) at the upper right corner of the map and the map number of the region involved, character B shows a map data storage section for storing the map data of the region, and character X shows a blank section. By the reader 3 reading the sections A and B, the microcomputer 4 is supplied with the map data and absolute coordinate data of the specific region.

Figure 8:
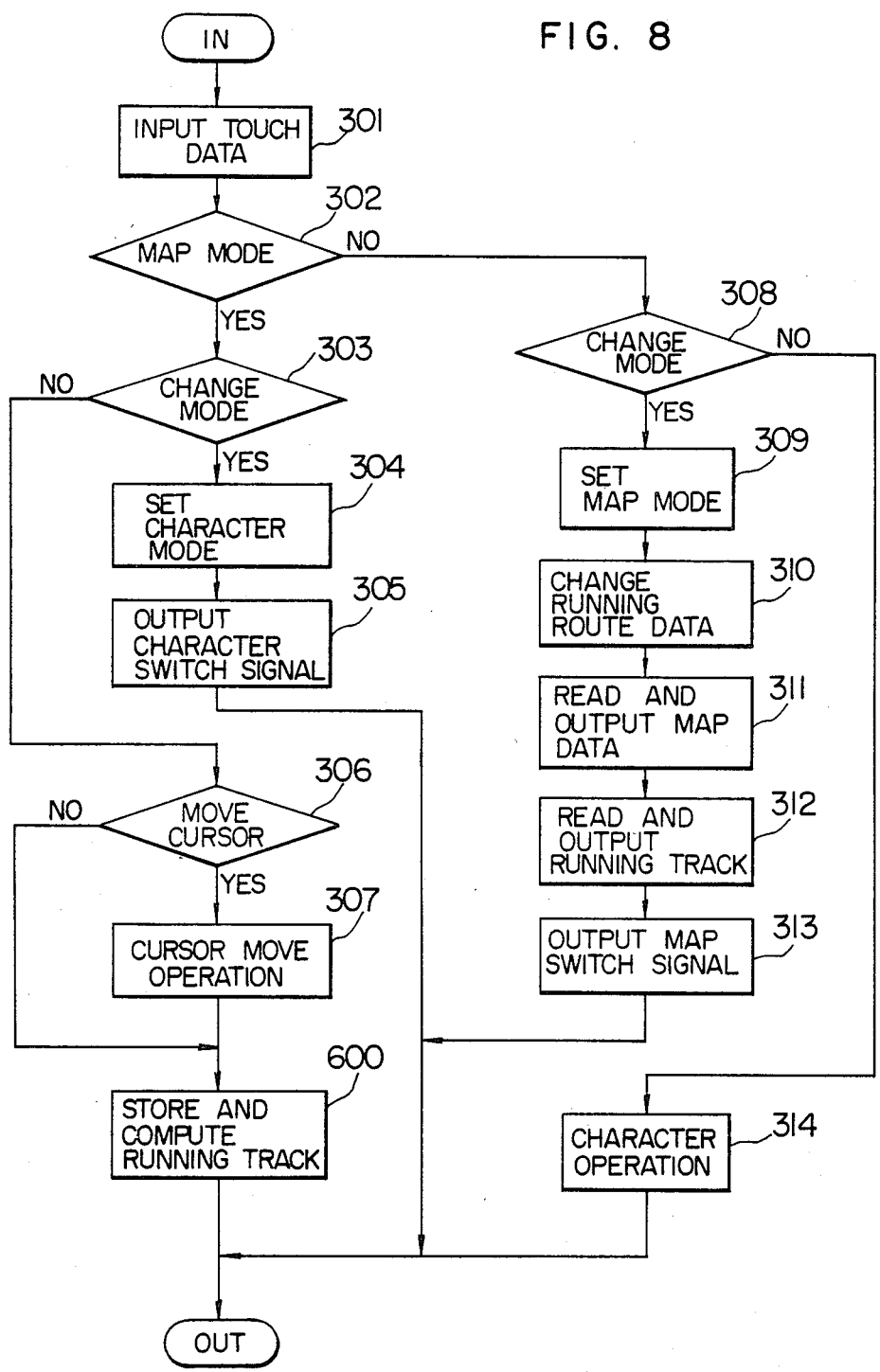
FIG. 8 is an operation flow chart showing the detailed operating processes of the mode operational routine in FIG. 6.
Figure 9:
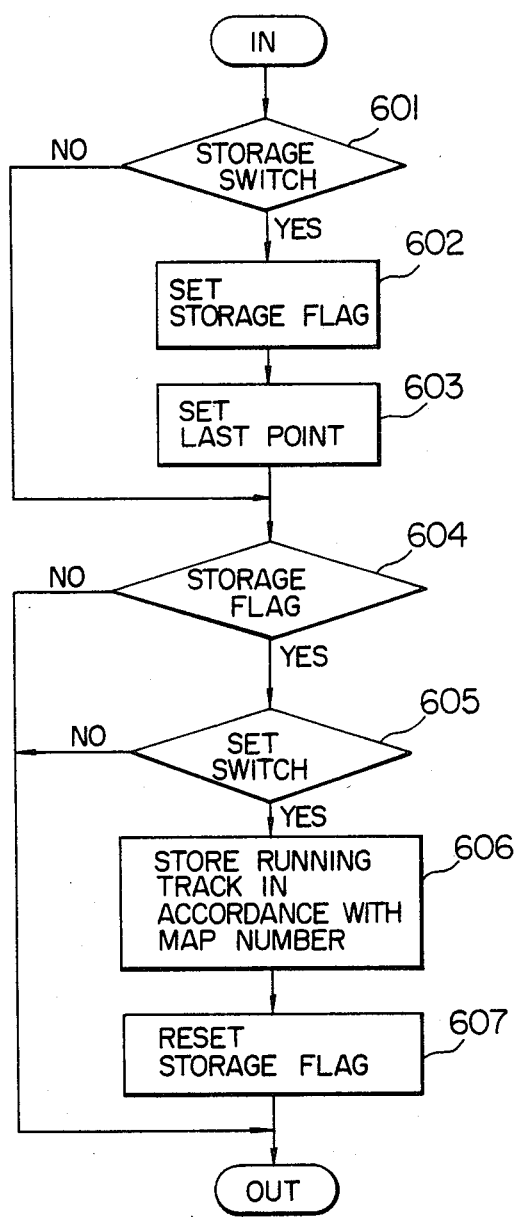
FIG. 9 is an operation flow chart showing detailed operating processes of a running track storage operational routine in FIG. 8.
Figure 10:
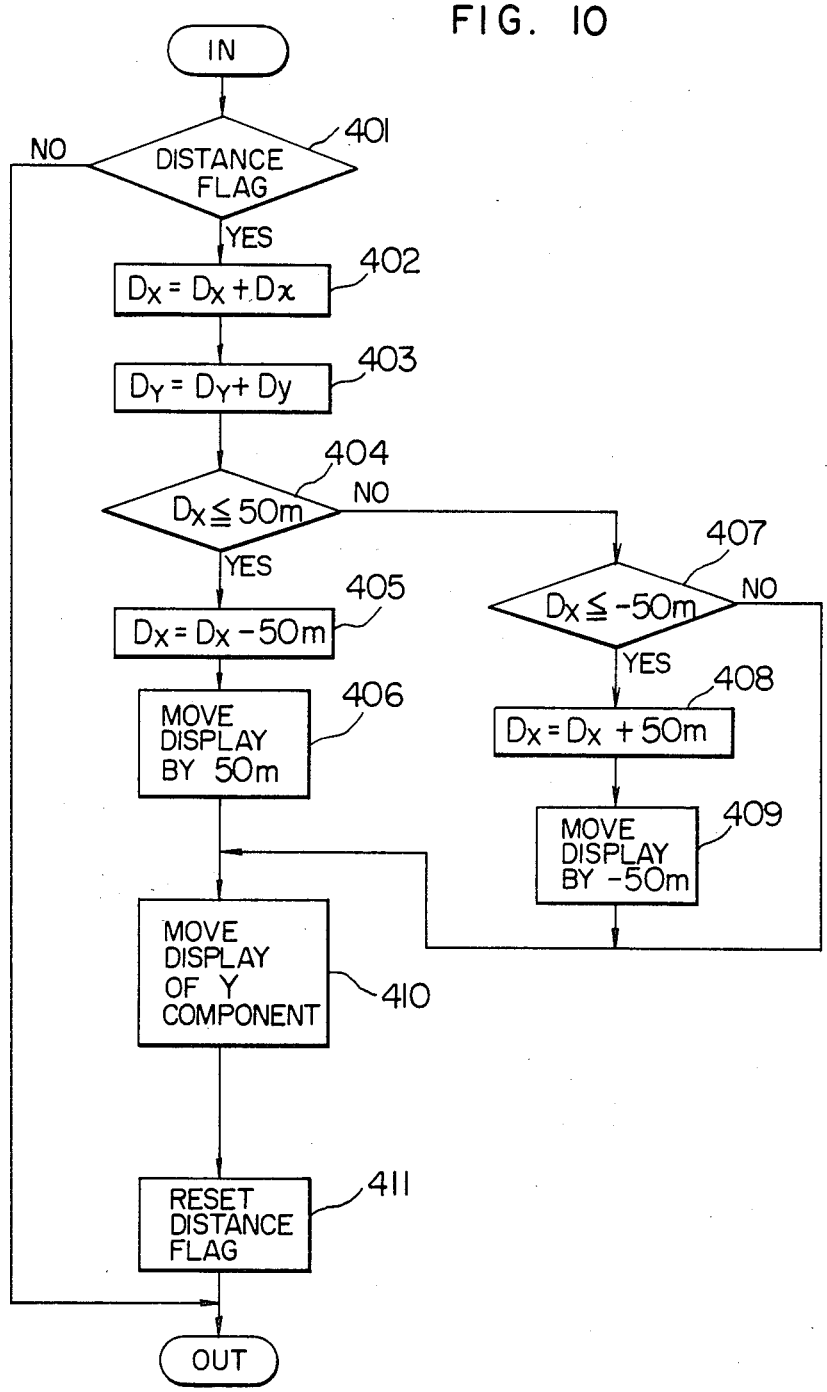
FIG. 10 is an operation flow chart showing detailed operating processes of the present position operational routine in FIG. 6.
Figure 11:
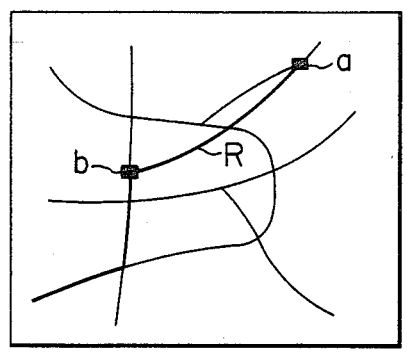

The operation of this apparatus having the above-mentioned configuration will be explained with reference to the diagrams of FIGS. 5 and 11 and the operation flowcharts of FIGS. 6 to 10. FIG. 6 shows an operation flowchart of the general processing operation of the main routine of the microcomputer 4, FIG. 7 an operation flowchart of the processing operation of an interruption operational routine based on the distance pulse produced from the distance sensor 2, FIG. 8 is an operation flowchart showing the detailed processing operation of the mode operational routine in FIG. 6, FIG. 9 is an operation flowchart showing the detailed processing operation of the running track storage operational routine in FIG. 8, and FIG. 10 is an operation flowchart showing the detailed processing operation of the present position computation routine in FIG. 6.

Assume that the key switch is turned on for starting the operation of a vehicle having the component elements 1 to 9 shown in FIG. 1. Each electrical system is turned on by the power supplied from the vehicle battery. The microcomputer 4 is also activated by being supplied with a stabilized voltage of 5 V from a stabilized power supply circuit so that the processing operation is started from the start step 100 in FIG. 6, followed by the initialization routine 200 where the registers, counters and latches in the microcomputer 4 are initialized for starting the processing operation. After this initialization, the processing operations of the mode operational routine 300 and the present position operational routine 400 are executed repeatedly at intervals of about several tens of msec.

Specifically, the mode operational routine 300 selects the map mode or character mode and causes the content corresponding to the selected mode to be displayed on the CRT. In map mode, movement of the cursor indicating the present position and storage of the running track are made possible, while in character mode, designation of the map of a specific region is made possible, followed by the proceeding to the present position operational routine 400. At this present position operational routine 400, the present position data and the running track data in the second graphic memory 22 of the CRT controller 5 are changed for the distance coverage of every ±50 m in X and Y components. At the same time, the latest data on the running track is stored in the RAM 4c followed by the return to the mode operational routine 300. Subsequently, the processing operation of the main routine from the mode operational routine 300 to the present position operational routine 400 is executed repeatedly at intervals of about several tens of msec.

Figure 7:
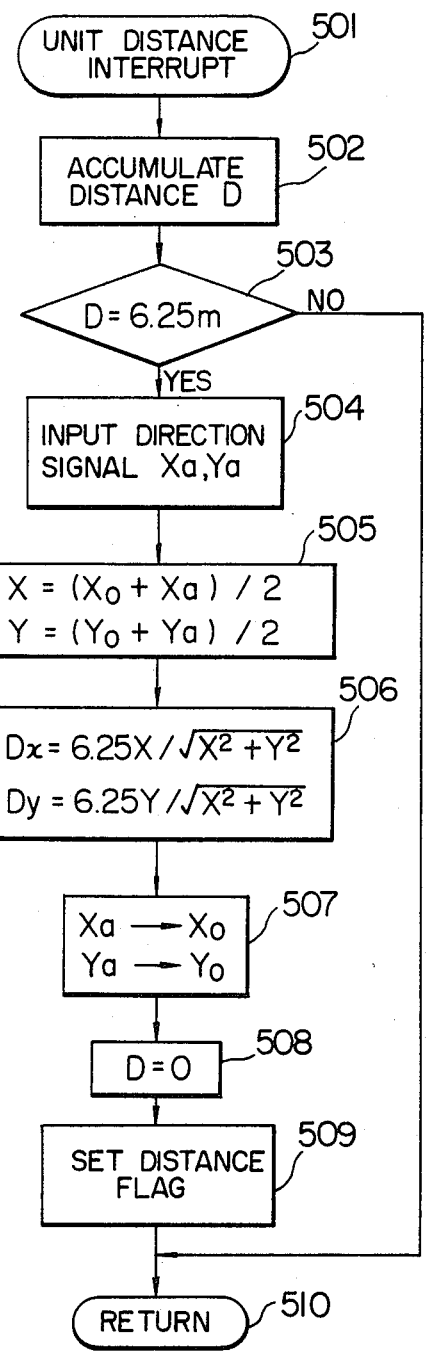
FIG. 7 is an operation flow chart showing the operating processes of an interruption operational routine based on the distance pulse produced from a distance sensor.

When a distance pulse is applied from the distance sensor 2 to the interrupt (INT) terminal of the microcomputer 4 during the repeated operation of the main routine, the microcomputer 4 suspends the processing operation of the main routine and executes the processing operation of the interruption shown in FIG. 7. Specifically, the processing operation is started from the interrupt start step 501, and the process is passed to the accumulation step 502 where the unit distance data (corresponding to about 39.2 cm) are updated by accumulation on the distance data D stored in the RAM 4c, followed by the distance decision step 503 for deciding whether or not the distance data D has reached the length of 6.25 m. If the distance data D has not reached 6.25 m, the decision is NO, and the process proceeds to the return step 510. If the distance data D has reached 6.25 m, on the other hand, the decision is YES, followed by the direction signal input step 504. At this direction signal input step 504, the digital signals Xa, Ya of X and Y components (north and east are assumed to be positive, and west and south to be negative directions) are inputted from the direction detector 1, followed by the average direction calculation step 505 for determining the average direction data X, Y from previous direction data Xo, Yo (the direction data before coverage of 6.25 m) and the present direction data Xa, Ya. The process is then passed to the distance component computation step 506 where the distance component Dx in X direction is determined as $6.25X/\sqrt{X^2+Y^2}$, the distance component Dy in the Y direction as $6.25Y/\sqrt{X^2+Y^2}$ ($X/\sqrt{X^2+Y^2}$ corresponding to $\cos\theta$ of the counterclockwise angle $\theta$ from the east, and $Y/\sqrt{X^2+Y^2}$ corresponding to $\sin\theta$ thereof), followed by the storage step 507 where the present direction data Xa, Ya are stored as Xo, Yo for the next case. The process proceeds to the distance data reset step 508 for resetting the distance data D to zero, followed by the distance flag set step 509 for setting the distance flag. The process is then passed to the return step 510 for restoring the main routine which was interrupted. In other words, the interruption operational routine accumulatively updates the distance data D for each coverage of the unit distance, and when the distance data D reaches 6.25 m, the distance components Dx, Dy for the X and Y directions are computed for the length of 6.25 m, thus setting the distance flag.

The processing operation of the mode operational routine of the main routine will be now explained in detail. The mode operational routine 300 starts the processing operation from the touch data input step 301 in FIG. 8 and stores the touch data from the touch panel section 7 in the RAM 4c. The process is then passed to the map mode decision step 302, where it is decided whether or not the content of the mode area in the RAM 4c is a map mode, and if it is a map mode, the decision is YES, so that the process proceeds to the mode change decision step 303 for deciding whether or not the touch data stored in the RAM 4c is data indicative of a mode change (the data obtained by depressing the touch area 34). If the touch data is the one indicative of a mode change, the decision is YES, and the process is passed to the character mode setting step 304 for setting the content of the mode area to a character mode. The process then proceeds to the character switch signal output step 305, where a character switch signal for displaying the character image on the CRT display unit 6 is generated in the video controller 26 of the CRT controller 5, thus completing one processing operation of the mode operational routine 300.

If the touch data is not the one indicative of a mode change, that is, if it is the data obtained by depressing other than the touch area 34 or none of the touch areas is depressed in FIG. 3 (such as data FF), on the other hand, the decision at the mode change decision step 303 is NO, followed by the cursor move decision step 306. The cursor move decision step 306 decides whether or not the touch data is the one obtained by depressing any of the touch areas 32, 33, 35, 38, 40 and 41 (the data for cursor move), that is whether or not any of the touch areas 32, 33, 35, 38, 40 and 41 in FIG. 3, which function as a switch for cursor movement, is touched. If the touch data is not the one for cursor movement, the decision is NO. If the touch data is for cursor movement, on the other hand, the decision is YES, followed by the cursor move operation step 307. At this cursor move operation step 307, if the touch data is the one obtained by depressing the touch area 32 or 33, the content of the second graphic memory 22 of the CRT controller 5 is changed in such a manner that the cursor of the present position displayed on the CRT display unit 6 is moved northward by a predetermined distance. In similar fashion, the contents of the second graphic memory 22 are changed in such a way that if the touch data is the one obtained by depressing the touch area 35, the cursor is moved westward; if the touch data is associated with the depression of the touch area 40 or 41, the cursor is moved southward; and if the touch data is associated with the depression of the touch area 38, the cursor is moved eastward, by a predetermined distance.

In the case where any of the touch areas 32, 33, 35, 38, 40 and 41 continues to be depressed, therefore, the touch signal generator circuit continues to generate touch data at intervals of 40 ms so that the cursor may be moved continuously at intervals of 40 ms.

The process is then passed to the running track storage operational routine 600. The processing operation of the routine 600 is shown in detail in FIG. 9. First, the step 601 decides whether or not a storage command is generated by the closing of the storage switch 8. If a storage command is not generated, the decision is NO. If the storage switch 8 for storing the running route is turned on thereby to produce a storage command from the storage switch 8, the decision is YES, so that the process is passed to the step 602 for setting the storage flag, followed by the step 603 for setting the X and Y coordinate data for the present position corresponding to the present cursor position. The process is then passed to the step 604 for deciding whether or not the storage flag is set, and if the storage flag is set, the decision is YES, followed by the step 605 where it is decided whether or not the set command is generated by the turning on of the set switch 9. If the set command is not generated, the decision is NO, thus waiting for the generation of a set command by the turning on of the set switch 9.

By the touching operation of the touch panel section 7, the cursor is set at the starting point of the running track to be stored (the starting point b of the running track R covering the road not indicated on the road map with respect to the present position a). Upon subsequent turning on of the set switch 9, a set command is generated from the set switch 9, so that the decision at step 605 is YES. The process is then passed to the step 606 for selecting the running track data between the last point (set by the step 603) among the latest running track data (comprising X, Y coordinates of each running point) stored in the RAM 4c and the starting point (according to the present cursor position). At the same time, the running track data are stored in the RAM 4c in accordance with the map number of the map, followed by the step 607 for resetting the storage flag.

When the decision at the map mode decision step 302 is NO, by contrast, the process is passed to the mode change decision step 308 for deciding whether or not the mode is to be changed by the processing operation similar to the mode change decision step 303. If the decision is YES as a mode change is involved at this time, the process proceeds to the map mode set step 309 for setting the content of the mode area in the RAM 4c to map mode, followed by the data conversion step 310 for converting the running route data of the second graphic memory 22 of the CRT controller 5. In this case, the reader 3 is first controlled to search for a designated region by the map number thereof. A coordinate conversion value is computed from the absolute coordinate data of the map thus searched for (stored in the header section A in FIG. 4) and the absolute coordinate data of the map of the previous region, and according to the resulting computed value, the data on the running track and present position in the second graphic memory 22 are modified so that the running track and present position which are to be displayed on the CRT may be shifted by the computed coordinate conversion value. The process is then passed to the map data read output step 311, where the map data of the cassette tape 3a is inputted through the reader 3 while at the same time applying the map data to the first graphic memory 21, followed by the running track read output step 312 for determining whether or not the running track data corresponding to the particular map number (stored by the processing operation of the running track storage operational routine 600) remains stored in the RAM 4c by the map number of the region designated. At the same time, any running track data that may be stored therein is read out and applied to the first graphic memory 21, followed by the map switch signal output step 313 for causing the video controller 26 to generate a map switch signal for projecting the graphic image of the map on the CRT display unit 6, thus completing one processing operation of the mode operational routine 300. Specifically, when switching from the character image to a graphic image of another map, the above-mentioned processing operation is executed so that the present map data and the running track data stored previously are stored in the first graphic memory 21, while at the same time converting the content of the second graphic memory 22 in a manner to correct the cursor to indicate the running track and the present point at the present position corresponding to the map involved. By doing so, even if the map displayed on the CRT display unit is switched, the running track and the present position are capable of being displayed on the part corresponding to the map, while at the same time displaying the running track previously stored on the map display.

In the event that the decision at the mode change decision step 308 is NO, on the other hand, the process is passed to the character operational step 314. When this character operational step 314 is reached, the character mode is set with a character switch signal produced in the video controller 26. Therefore, the character image as shown in FIG. 5 is on display on the CRT display unit 6. The numerals 02-4-68 at the central part of the character screen show the district, area and region respectively. The character operational step 313 processes the numerals in such a manner that they are updated by addition by one through the increment switch 51, updated by subtraction by one through the decrement switch 52, set by the set switch 53, and reset by the reset switch 54. The numerical data on the district, area and region making up a map number are stored in the RAM 4c. The switches 51, 52, 53 and 54 correspond to the touch areas 39, 40, 41 and 42 in FIG. 3 respectively.

Specifically, the mode operational routine shown in FIG. 8 performs the operations 1 to 5 described below in accordance with the touch data from the touch panel section 7, the commands from the storage switch 8 and the set switch 9 and the content of the mode area.

1. In response to a cursor move command issued in map mode without any mode change command, the processing operation for cursor movement is executed, while in the absence of a cursor move command, the map display is continued.

2. In map mode without any mode change command, the running track is stored in accordance with the operation commands of the storage switch 8 and the set switch 9, so that the running track thus stored is additionally displayed on subsequent occasions of map display of the region involved.

3. In response to a mode change command in map mode, the map mode is changed to character mode while at the same time displaying the character image on the CRT display unit.

4. In character mode without any mode change command, a map change on the character image as shown in FIG. 5 is acceptable.

5. In response to a mode change command in character mode, the character mode is changed to the map mode, so that the graphic image of the map is displayed on the CRT display unit while at the same time correctively displaying the running track and the present position thereon.

Now, the processing operation of the present position operational routine 400 of the main routine will be explained in detail. This present position operational routine 400 starts the processing operation from the distance flag decision step 401 of FIG. 10 and decides whether or not the distance flag is set by the interruption processing operation of FIG. 7. If the distance flag is not set, the decision is NO, thus ending one processing operation of the present position operational routine 400. If the distance flag is set, on the other hand, the decision is YES, followed by the advnce to the X distance correction step 402. The X distance correction step 402 correctionally computes the X distance data DX by the X distance component Dx determined by interruption ($DX=DX+Dx$), and the Y distance correction step 403 similarly correctionally computes the Y distance data DY ($DY=DY+Dy$), followed by the first X distance decision step 404 for deciding whether or not the X distance data DX has exceeded 50 m. If the X distance data DX has exceeded 50 m, the decision is YES, and the process is passed to the X distance subtraction step 405, where the value of 50 m is subtracted from the X distance data DX, followed by the display move step 406 where the present position data in the second graphic memory 22 is moved by 50 m in positive direction (eastward) while at the same time making the running track data follow it.

In the case where the decision at the first X distance decision step 404 is NO, the process is passed to the second X distance decision step 407 for deciding whether or not the X distance data DX has been reduced below −50 m. If the X distance data DX is smaller than −50 m, the decision is YES, followed by the X distance add step 408 for adding the value of 50 m to the X distance data DX. The process then proceeds to the display move step 409 where the present position data in the second graphic memory 22 is moved by 50 m in negative direction (westward) while at the same time making the running track follow it.

When the decision at the second X distance decision step 407 is NO, or after the display move step 406 or 409, the process is passed to the Y component display move processing routine 410, where a decision and processing operation similar to the steps 404 to 409 are effected on the Y distance data DY obtained at the Y distance correction step 403. (When the Y distance data exceeds 50 m in positive or negative direction, the present position data and the running track data in the second graphic memory 22 are moved by 50 m in corresponding direction.) The process is then passed to the distance flag reset step 411 for resetting the distance flag.

With the change of the present position data in the second graphic memory, the X and Y coordinate data of the present position in the RAM 4c are updated, and the latest running track data in the RAM 4c are also updated (only the latest one is stored, while erasing the older ones).

Specifically, the present position operational routine 400 shown in FIG. 9 changes the present position data and the running track data in the second graphic memory 22 without regard to the image on display on the CRT display unit 6 while at the same time updating the X and Y coordinate data of the present position and the running track data in the RAM 4c.

By repetitive operation of the main routine of the mode operational routine 300 and the present position operational routine 400 and the interrupt operation of FIG. 7, the present position data and the running track data in the second graphic memory 22 are sequentially changed. At the same time, the image of the CRT display unit 6 is selected according to the mode designated, and if a map mode is involved, the graphic image of the map (including the display of the present position and the running track) is projected, while if a character mode is involved, the character image for map designation shown in FIG. 5 is displayed.

Further, in compliance with the operation commands from the storage switch 8 and the set switch 9, the running track is stored and the running track thus stored is additionally displayed on the particular map selected for display on the next occasion.

Figure 12:
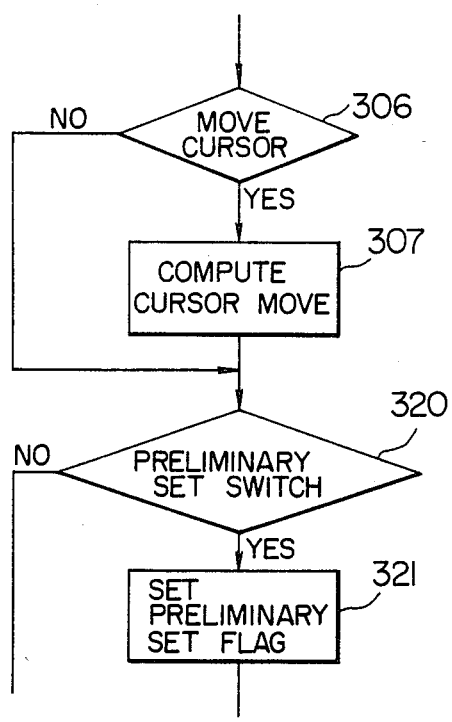
FIG. 12 is an operation flow chart for a second embodiment showing partial operating processes of the mode operational routine in FIG. 6.

A second embodiment of the present invention additionally comprises a preliminary switch 80 and a start switch 90 shown by dashed lines in FIG. 1 for facilitating the setting of the present position. FIG. 12 is an operation flowchart showing the partial processing operation of the mode operational routine of FIG. 6.

The preliminary set decision step 320 decides whether or not a preliminary set command is generated from the preliminary set switch 80 for effecting a preliminary setting. If a preliminary set command is not issued, the decision is NO, while in the presence of the preliminary set command, the decision thereof is YES, so that the process is passed to the preliminary set flag set step 321 for setting the preliminary set flag.

Figure 13:
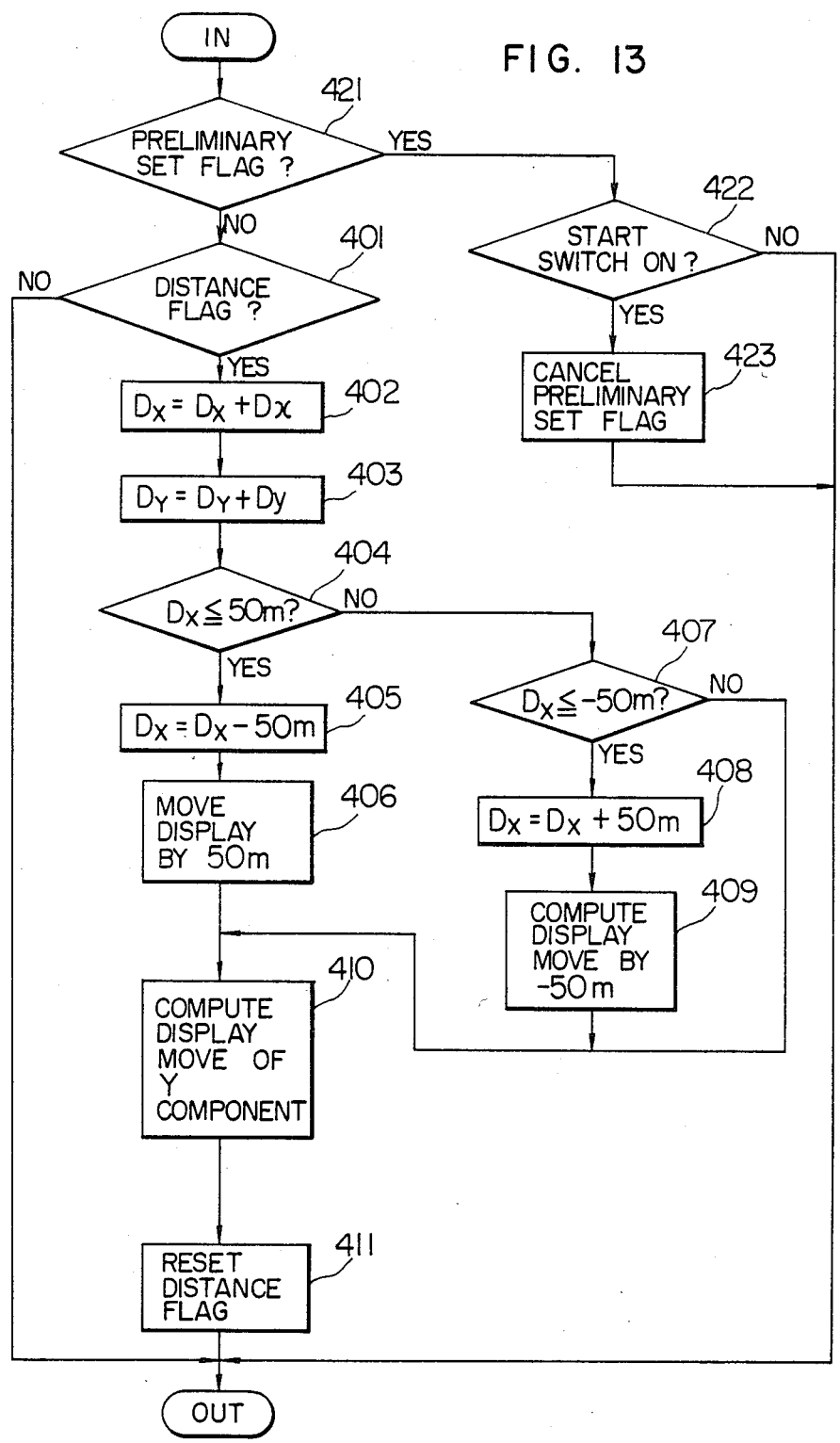
FIG. 13 is an operation flow chart for the second embodiment showing detailed operating processes of the present position operational routine in FIG. 6.

The present position operational routine 400 of the second embodiment starts the processing operation thereof from the preliminary set flag decision step 421 of FIG. 13 and decides whether or not the preliminary set flag is set at the mode operational routine 300. If the preliminary set flag is not set, the decision is NO, so that the process is passed to the distance flag decision step 402.

If the decision at the preliminary set flag decision step 421 is YES, on the other hand, the process proceeds to the start switch decision step 422 for deciding whether or not a start command is issued from the start switch 90. If the start command is not issued, the decision thereof is NO, while if the start command is issued, the decision is YES, so that the process is passed to the preliminary set flag cancel step 423 for cancelling the preliminary set flag.

Specifically, the present position operational routine 400 in FIG. 13 changes the present position data and the running track data in the second graphic memory 22 without regard to the image displayed on the CRT display unit 6 when the preliminary set flag is not set, while if the preliminary set flag is set, the processing operation for updating the present position is prohibited until the start switch 90 is turned on.

Figure 5:
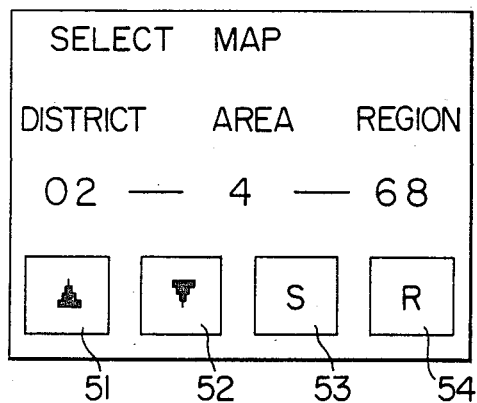
FIGS. 5 and 11 are diagrams for explaining the display conditions of a CRT display unit.
Figure 6:
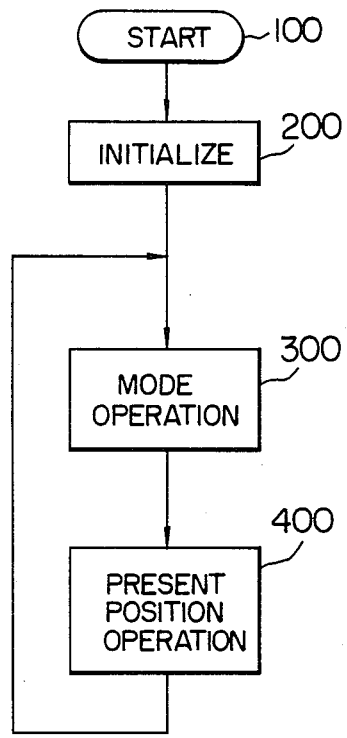
FIG. 6 is an operation flow chart showing the general operating processes of the main routine of a microcomputer.

The repeated processes of the mode operational routine 300 and the present position operational routine 400 in the main routine and the interrupt operation of FIG. 7 are performed in such a manner that when the preliminary set switch 80 is not turned on, the present position data and the running track data in the second graphic memory 22 are sequentially changed, and the image of the CRT display unit 6 is selected in accordance with the designated mode, so that the graphic image of a map (including the display of the present position and the running track) is displayed in map mode, while the character image for map designation shown in FIG. 5 is displayed in character mode. In the case where the preliminary set switch 80 is turned on with the cursor preliminarily set at a specific point on the road map, the cursor begins to move from the fixed position upon turning on of the start switch 90 when the vehicle actually runs to the position corresponding to the specific point.

In this embodiment, the CRT display unit 6 used as display means may be replaced with equal effect by a liquid crystal display means or an EL display means.

Also, instead of storing the running track by use of movement of cursor, a transparent tablet may be placed in front of the CRT display unit so that the tablet position on the running track to be stored is manually operated thereby to detect and store the running track manually.

In the embodiment described above, the running track actually covered is stored. This may be replaced by a method in which storage operation is performed before coverage of the running track to store the running track simultaneously with the actual coverage so that the running track thus stored may be additionally displayed on the next map display of the region involved.

Further, the method of the above-mentioned embodiment in which the present position is computed from the signals produced by the direction detector 1 and the distance sensor 2 may be replaced by a method in which the present position may be displayed in response to position code data transmitted from a transmitter installed at a strategic point of the region.

Further, as an alternative to the shown method in which a new running track not included in the map is stored in the RAM 4c, a new running track may be written directly in the blank section X (See FIG. 4) of the map tape 3a.

Furthermore, instead of determining the direction by detecting the earth magnetism, the relative positions of the vehicle with respect to a reference direction may be detected.

In addition, without using the preliminary set switch 80 and the start switch 90 separately, a single switch may be used to issue a preliminary set command upon the turning on thereof, and to issue a start command upon the turning off thereof.

Further, although the movement of the cursor is prohibited with the movement of the vehicle after the preliminary setting in the above-mentioned embodiments, a preliminary set specific point may be stored and the movement of cursor is liberated even after the preliminary setting, while upon turning on of the start switch 90, the cursor may be moved to the specific point set preliminarily.

What is more, instead of preliminarily setting the specific point with cursor, an indication mark (such as X) for preliminary setting may be used separately from the cursor.

We claim:

1. A vehicle navigator for displaying a running track of the vehicle, comprising:
   present position detector means for detecting the present position of the vehicle and outputting a present position signal corresponding to the present position of the vehicle;
   first memory means for storing a plurality of original road maps indicative of running tracks of the vehicle, said first memory means selectively reading out map data corresponding to one of said plurality of original road maps in response to a control signal;
   control means comprising:
   first means for receiving said present position signal from said present position detector means, and for outputting said control signal to said first memory means in order to receive said map data, wherein said first means processes said received present position signal and said map data to generate a display signal for displaying running route data of the vehicle on said map data;
   second means for receiving and storing the map data and the running route data, including running track data and the present position of the vehicle, in response to said display signal from said first means and for generating corresponding video and sync signals;
   display means for receiving said video and sync signals from said second means in order to display said map data and said running route data;
   second memory means for storing as additional running track data a running track formed when the vehicle runs on a new road which is not indicated on the displayed map data; and
   road addition means for allowing said display means to additionally display, as a road, the additional running track data stored by said second memory means on the selected map data, when the selected map data is re-displayed by said display means.

2. A vehicle navigator according to claim 1, said present position detection means comprising:
   distance detection means for detecting a running distance of the vehicle;
   direction detection means for detecting a travelling direction of the vehicle; and
   calculation means for calculating the present position of the vehicle on the basis of the running distance of the vehicle detected by said distance detection means and the travelling direction of the vehicle detected by said direction detection means and outputting said present position signal to said first means.

3. A vehicle navigator for displaying a running track of the vehicle, comprising:
   present position detection means for detecting the present position of the vehicle and outputting a present position signal corresponding to the present position of the vehicle;
   map data memory means for storing a plurality of map data for a plurality of original road maps indicative of the running regions of the vehicle;
   map designation means for designating which one of said plurality of original road maps is to be displayed;
   display control means for reading map data of the original road map, designated by said map designation means, from said memory means and outputting a map display signal, and for receiving said present position signal from said present position detection means, wherein said present position signal is processed for generating and outputting a running track signal indicative of a running track of the vehicle on said designated original map;
   display means for receiving said map display and running track signals from said display control means for displaying the designated original map and the running track of the vehicle;
   additional running track storage means operably connected to said display control means for storing as additional running track data a running track formed when the vehicle runs on a new road which is not indicated on the designated road map in response to receipt of a memory command signal;

memory command means for outputting a storage command to said display control means when said additional running track data is to be stored and wherein said display control means issues said memory command signal to said additional running track storage means upon receipt of said storage command; and road addition means for allowing said display means to additionally display, as a road, the additional running track data stored by said additional running track storage means on the designated road map when the designated road map is re-displayed by said display means.

4. A vehicle navigator according to claim 3, said present position detection means comprising:

distance detection means for detecting a running distance of the vehicle;

direction detection means for detecting a travelling direction of the vehicle; and calculation means for calculating the present position of the vehicle on the basis of the running distance of the vehicle detected by said distance detection means and the travelling direction of the vehicle detected by said direction detection means and outputting said present position signal to said display control means.

* * * * *